Figure 1:
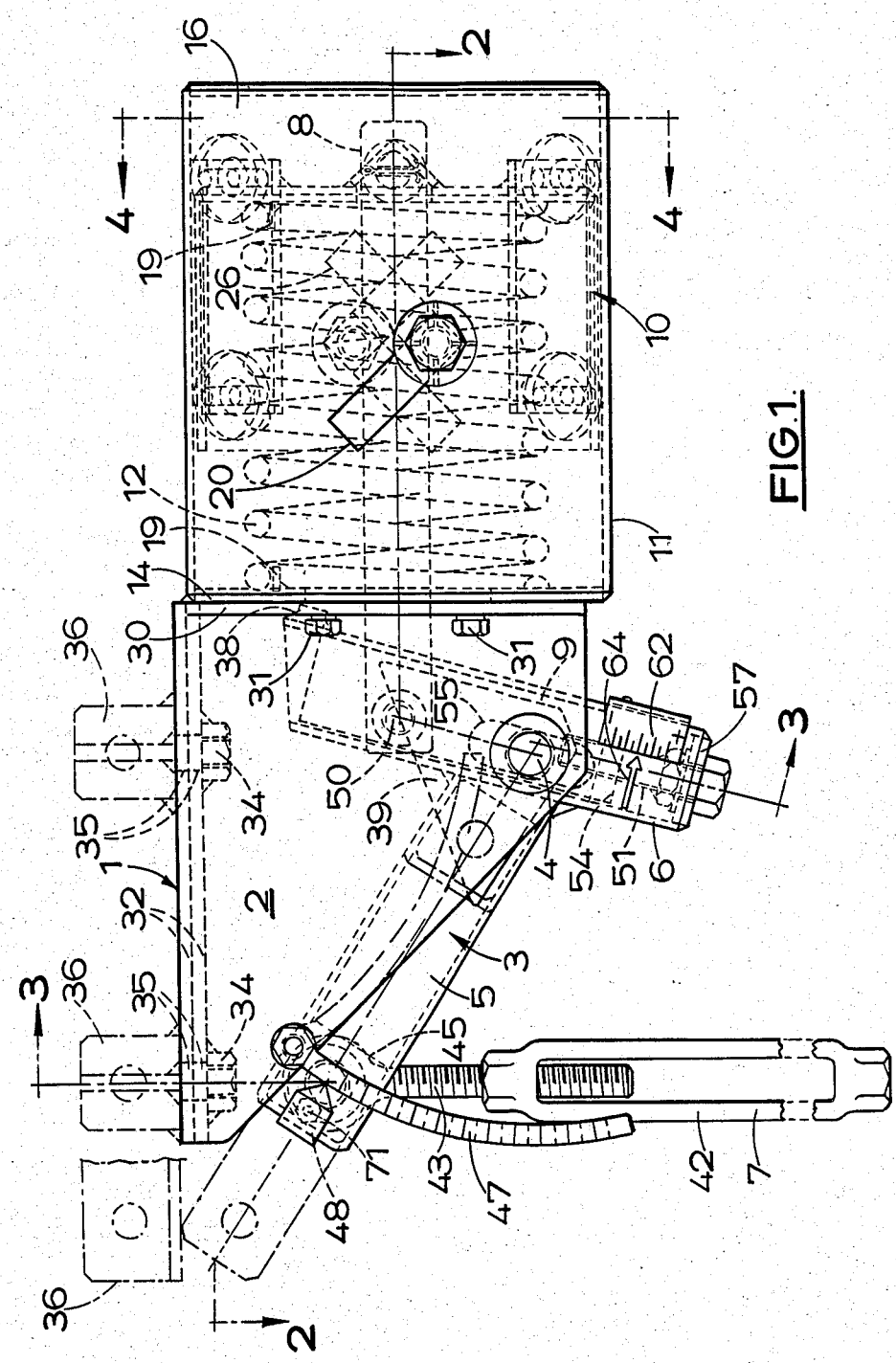

United States Patent [19]

Salter

[11] Patent Number: 4,640,487
[45] Date of Patent: Feb. 3, 1987

[54] PIPE SUPPORTS

[76] Inventor: Anthony J. Salter, Cherry Trees, The Ridgeway, Sedgley, Dudley, West Midlands, DY3 1BS, England

[21] Appl. No.: 723,740

[22] Filed: Apr. 16, 1985

[30] Foreign Application Priority Data

Apr. 17, 1984 [GB] United Kingdom ................ 8410006
Apr. 17, 1984 [GB] United Kingdom ................ 8410007

[51] Int. Cl.[4] ........................................... F16M 13/00
[52] U.S. Cl. .................................. 248/571; 248/542; 248/292.1; 267/140.2; 188/380
[58] Field of Search ............... 248/571, 572, 542, 665, 248/292.1, 325, 574, 575; 267/136, 140.2; 188/380

[56] References Cited

U.S. PATENT DOCUMENTS

| | | | |
|---|---|---|---|
| 2,974,914 | 3/1961 | Sherburne | 248/571 |
| 2,989,276 | 6/1961 | Debbage | 248/571 |
| 3,516,179 | 6/1970 | Dane | 248/571 X |
| 3,534,934 | 10/1970 | McCabe | 248/571 |
| 3,718,305 | 2/1973 | Suozzo | 248/571 |
| 4,206,898 | 6/1980 | Salter | 248/571 X |

FOREIGN PATENT DOCUMENTS

| | | | |
|---|---|---|---|
| 1242140 | 8/1971 | United Kingdom | 248/571 |
| 1388063 | 3/1975 | United Kingdom | 248/571 |
| 1388624 | 3/1975 | United Kingdom | 248/571 |

Primary Examiner—Ramon S. Britts
Assistant Examiner—Blair M. Johnson
Attorney, Agent, or Firm—Sand & Hudak Co.

[57] ABSTRACT

In a pipe support of the constant tension kind, spring means, which through a connecting link acts on a lever pivoted to a carrier, is adjustable relative to the carrier for altering the moment of the spring force about the pivot of the lever by varying the perpendicular distance from the pivotal axis to the central longitudinal axis of the connecting link. Slots in the carrier are engaged by screws which tighten into an end wall of a housing of the spring means to secure the spring means in adjusted positions. By the adjustment the moment of the spring force can be boosted, changes in the load moment of a supported pipe, e.g. as a result of pipe ratchet, can be readily compensated for, as also can deviations of the rating of the spring means from a mean manufacturing specification.

15 Claims, 10 Drawing Figures

PIPE SUPPORTS

This invention relates to pipe supports of the constant tension kind. Such pipe supports are used to support pipes which are subject to movement in use, for example caused by thermal expansion, the supports including spring means which provide a substantially constant supporting spring force for the pipes which permits the movement of the pipes.

Pipe supports of the kind described are intended to return the pipes they support in use to their original supported positions after they have deviated from those positions due to thermal expansion and contraction. In practice this may not always occur because of the effects of "pipe ratchet". This can result from the thermal expansion and contraction of pipes producing stress and molecular changes which distort the pipes to such an extent that they cannot return subsequently to their original supported positions. Usually the pipe ratchet increases the load moment on the lever, which increases the strain on the counterbalancing spring means. This is undesirable and may lead ultimately to overstressing of the pipe and failure of the spring means to offer sufficient effort to maintain the pipe in the required working position.

Replacement of the spring means to compensate for pipe ratchet in a pipe supported by a pipe support can be difficult and expensive to carry out. An alternative which has been proposed is to provide a separate auxiliary spring unit which is arranged to act in conjunction with the pipe support to support the pipe which has been subjected to pipe ratchet, and so relieve the spring means of at least some of the additional strain imposed by an increased load moment resulting from pipe ratchet. This too is an expensive way of dealing with the problem because of the additional equipment and fixings required.

An object of the present invention is to provide a pipe support of the constant tension kind in which adjustment can be made to compensate for the effect of pipe ratchet in a pipe which it supports in use.

The present invention consists in a pipe support of the constant tension kind which comprises a carrier on which a lever is pivoted, load attachment means on the lever and adapted to connect a pipe to be supported to the lever at a position spaced from the pivot, a connecting link connected to the lever, and spring means which acts on the lever through the connecting link and is adjustable relative to the carrier for altering the moment of the spring force about the pivot by varying the perpendicular distance from the pivotal axis of the lever to the central longitudinal axis of the connecting link.

Thus if the load moment of the pipe supported by the pipe support in use should change, as for example as the result of pipe ratchet, the position of the spring means can be adjusted to alter the spring moment accordingly and ensure that the load exerted on the lever by the pipe is satisfactorily counterbalanced by the spring means, without the need for replacing or augmenting the spring means.

In some installations, in order to allow for working variations in the load exerted by the supported pipe it may be desirable to boost the spring moment beyond that required to counterbalance the mean rated load of the pipe when initially setting up the pipe support for use. This may be effected with the spring means adjustment now provided. Similarly adjustment of the spring means may be made to allow for deviation of the rating of the spring means from a mean specification which may occur in manufacture.

It is known that with use of a pipe support deviation of the spring means from the initial rating can occur, the principal causes of the deviation being hysteresis, which results in relaxation of the spring means, friction, kinematic variations and manufacturing tolerances. Compensation for such deviation can be made in the pipe support according to the present invention by the spring means adjustment.

It is desirable for the spring means adjustment to provide infinitely variable adjustment of the spring means relative to the carrier within the limits of available adjustment, so that fine adjustment of the spring moment can be made. Conveniently the adjustment is made by having a slidable connection between the spring means and the carrier which can be secured by screw retention means against movement in any adjusted position of the spring means.

In addition to the spring means adjustment there may be provision, as is usual, for adjusting the distance from the lever pivot of the connection of the connecting link to the lever.

There may be just the one connecting link or more than one connecting link operating together in parallel.

The lever may be a bell-crank lever having the connecting link and attachment means connected to its respective arms such that the spring force on the lever is in a direction at, or substantially at, right angles to the direction in which the load is applied to the lever through the attachment means. In use of the pipe support with a bell-crank lever balancing of the pipe support is required to ensure that the operation of the support, particularly when single-point suspension is employed, is not affected by the overhanging mass of the spring means.

The connecting link may be connected to the lever at the same side of the lever pivot as the attachment means and such that the force which the spring means exerts on the lever through the connecting link is applied in a direction substantially opposite to that in which the load of a pipe attached to the lever by the attachment means is exerted on the lever. With such an arrangement the lever may be of a straight, or substantially straight, form which requires less space to operate in than a bell-crank lever. Accordingly the pipe support may then possibly be used in positions which might be too confined for it to be installed satisfactorily when it has a lever of bell-crank form. The mounting or means of support of the pipe support, the spring means and attachment means may all be in, or substantially in, alignment. Thus where, for example, the pipe support is intended to be suspended for use, the suspension means of the pipe support and the spring and attachment means may be in, or generally in, vertical alignment thereby avoiding or reducing the aforesaid overhanging of the mass of the spring means. The pipe support may be adapted to support a pipe from below. It may also be arranged to operate laterally of a pipe with which it is used.

By virtue of having the connecting link and attachment means connected to the lever at the same side of the lever pivot the load arm of the lever can be kept to a minimum. The pipe support may accordingly have high load-carrying capacity with short lever movement. Furthermore there may be provision for adjustment of the spring arm length with adjustment being made from the side of the lever pivot opposite to that at which the connecting link and attachment means are connected to the lever. The adjustment may be made from an end of the lever close to the lever pivot where there is ready accessibility for making the adjustment throughout the range of operating movement of the lever.

Figure 2:
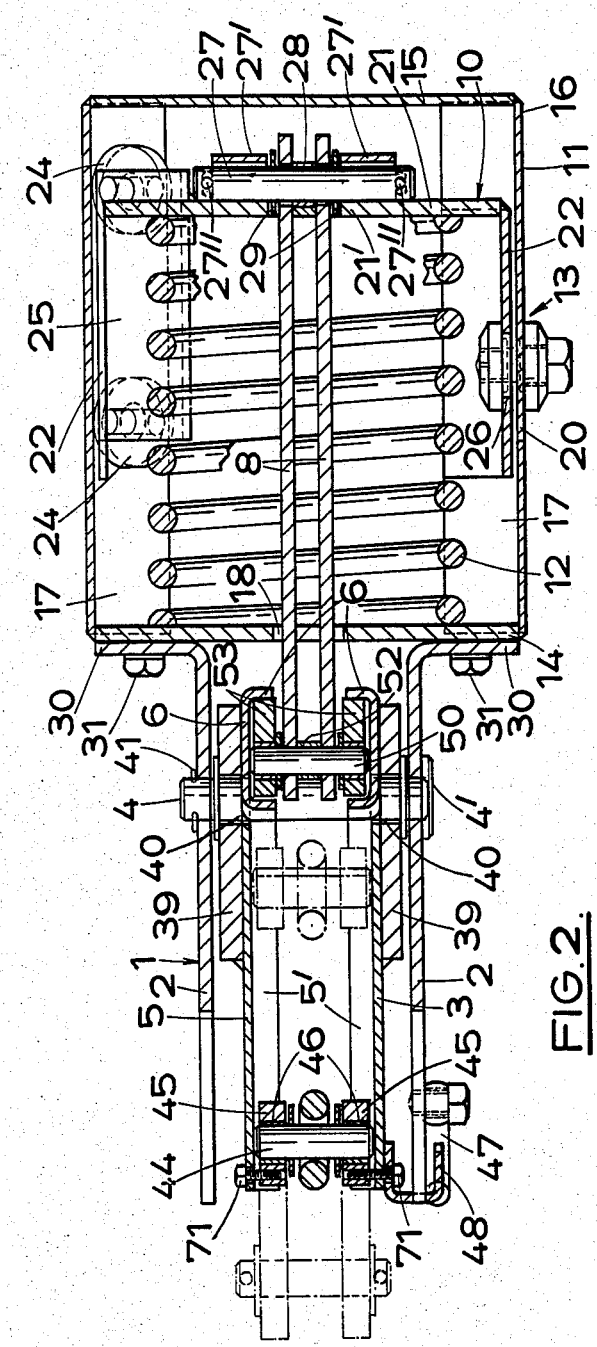
Figure 3:
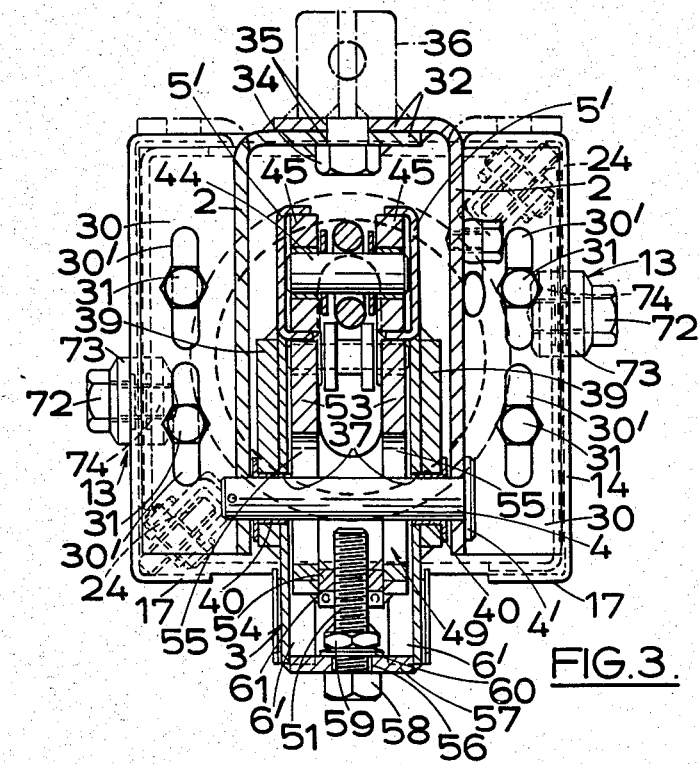
Figure 4:
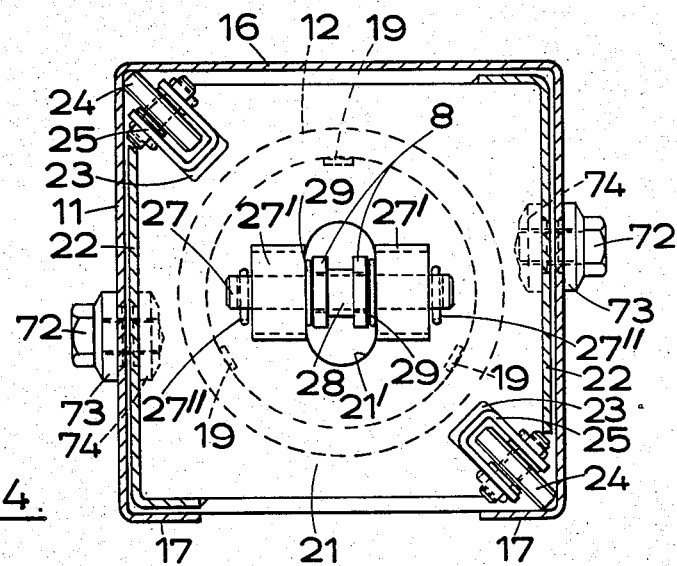
Figure 5:
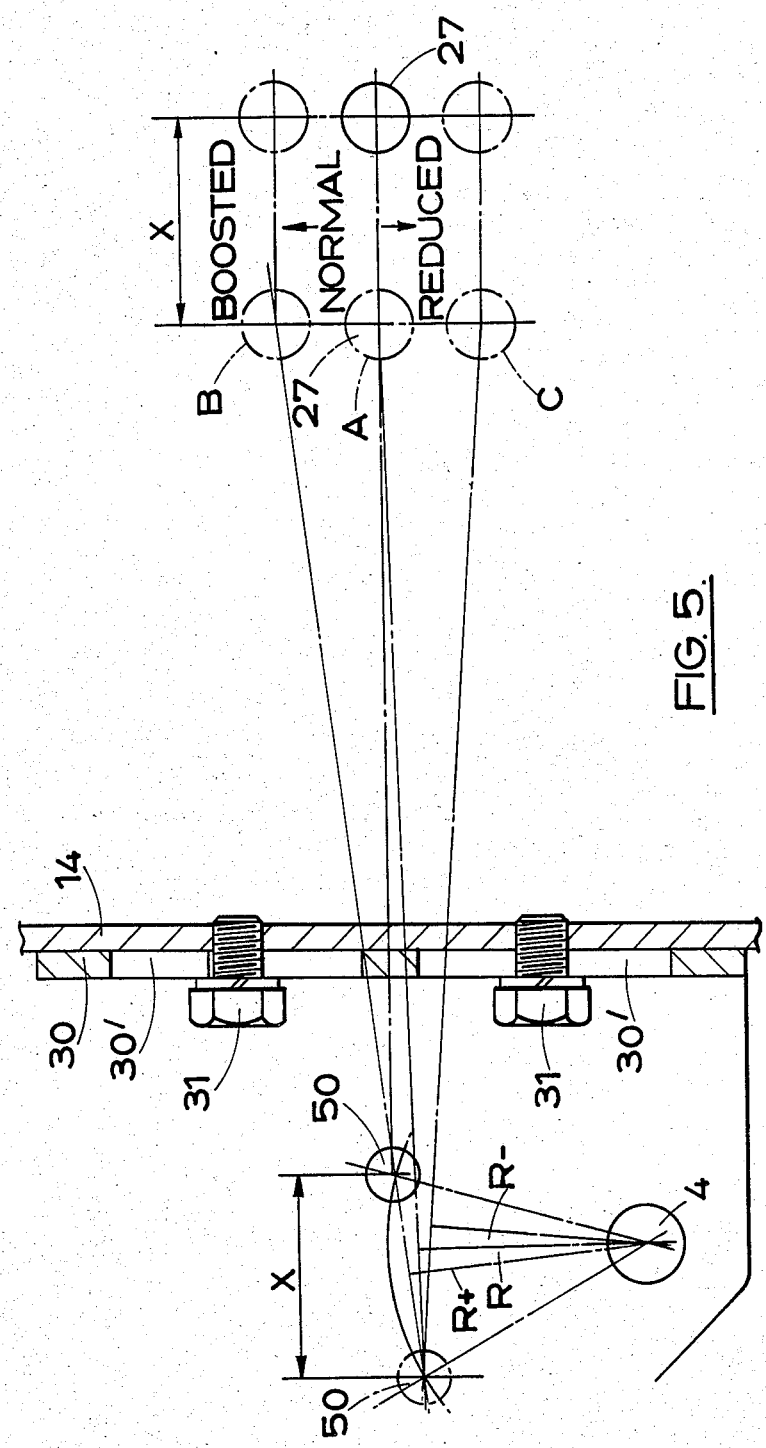
Figure 6:
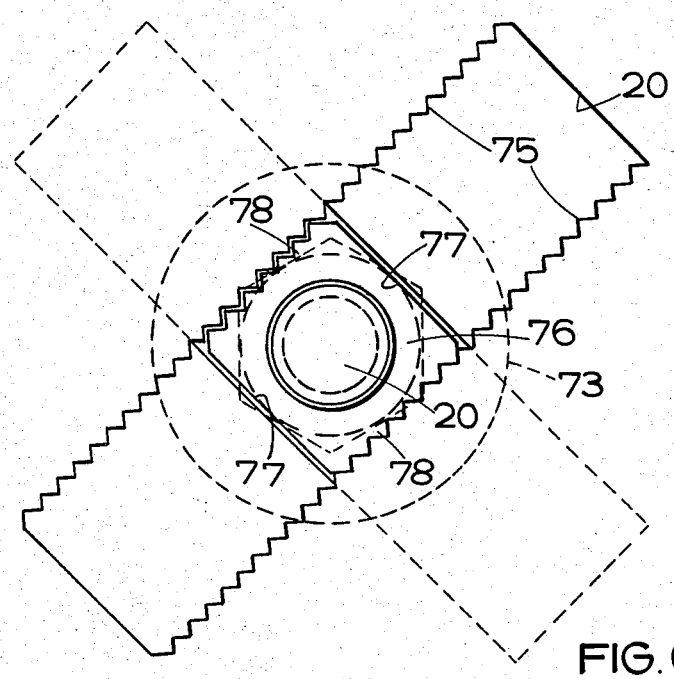
Figure 7:
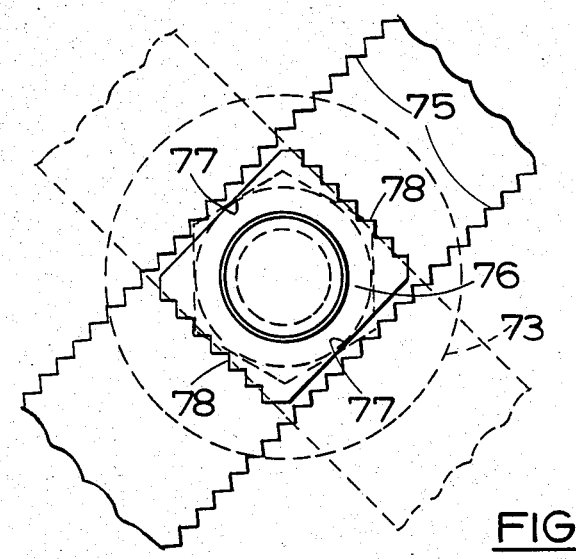
Figure 8:
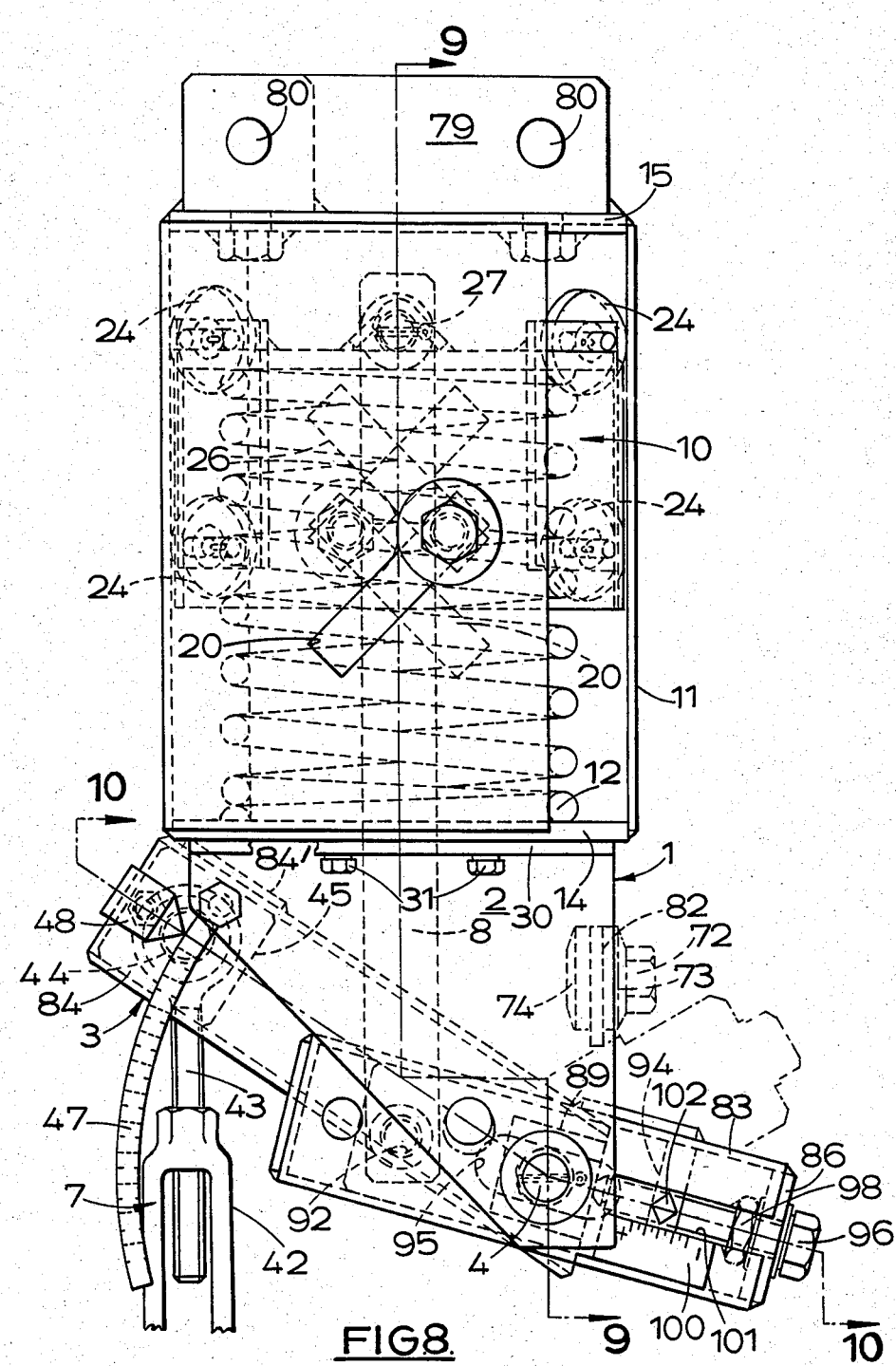
Figure 9:
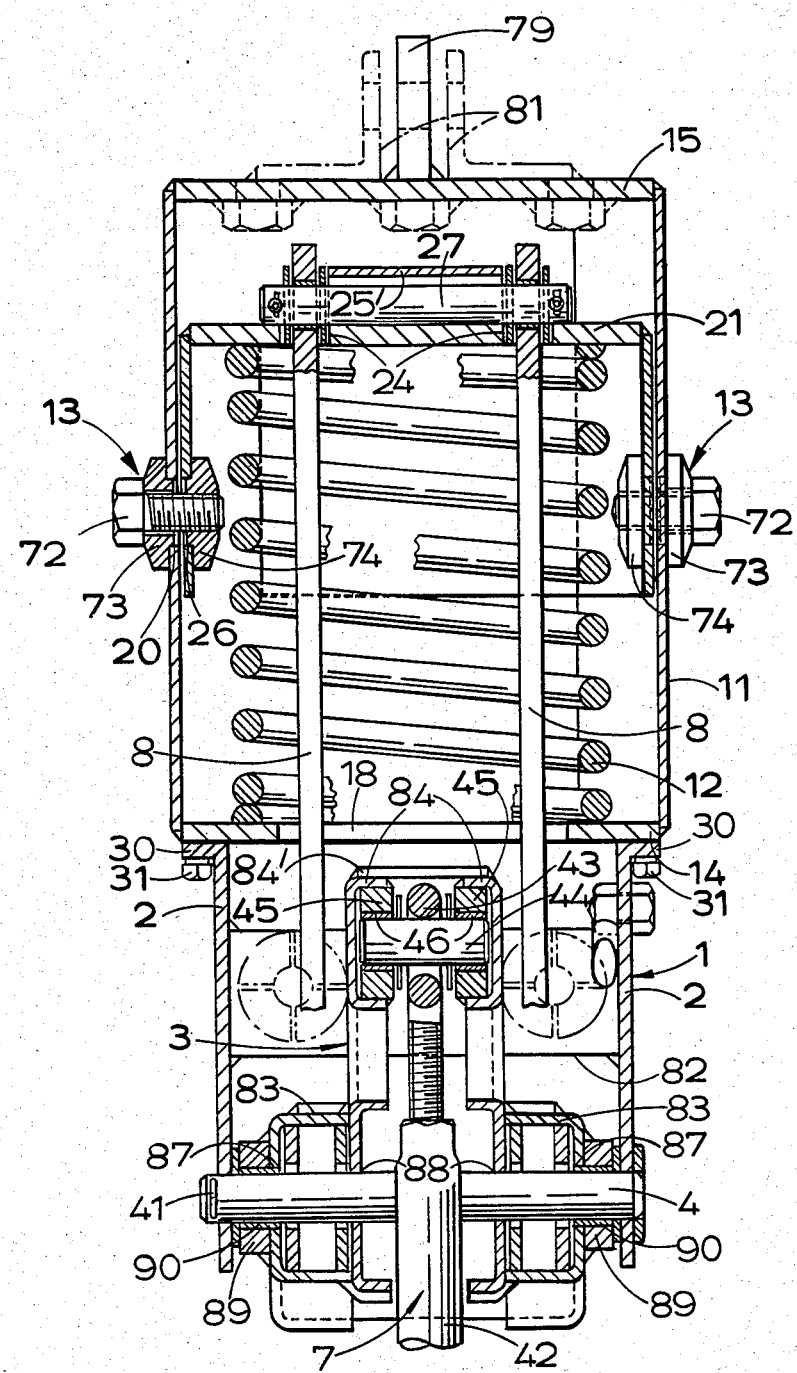
Figure 10:
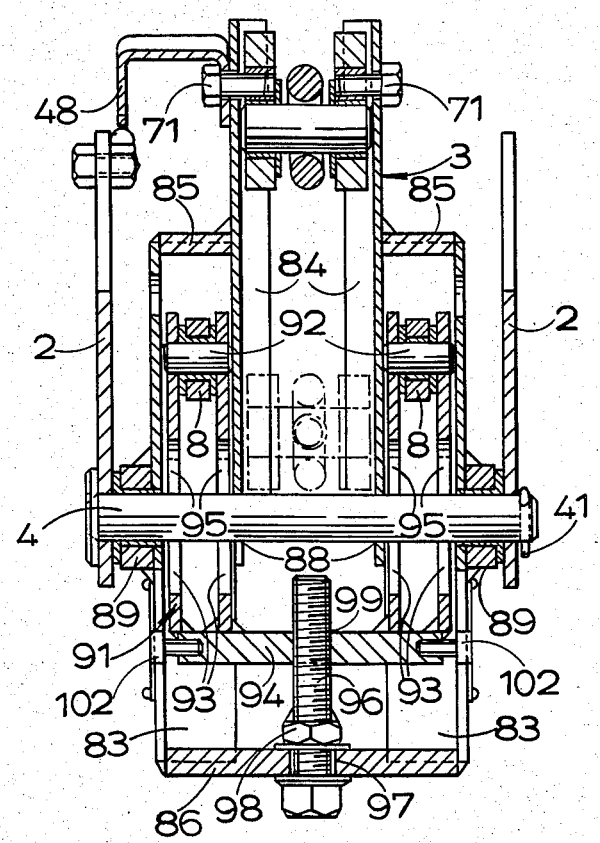

A pipe support embodying the invention will now be described by way of example with reference to the accompanying drawings in which, FIG. 1 is a side view of the pipe support, FIG. 2 is a section on line 2—2 of FIG. 1, FIGS. 3 and 4 are sections respectively on lines 3—3 and 4—4 of FIG. 1, FIG. 5 is a diagrammatic view showing the effect of adjusting spring means of the pipe support, FIGS. 6 and 7 are fragmentary views showing a modification to locking means of the pipe support in alternative positions, FIG. 8 is a side view of a modified version of the pipe support, FIG. 9 is a vertical section on line 9—9 of FIG. 8, and FIG. 10 is a transverse section on line 10—10 of FIG. 8.

Referring to FIGS. 1 to 5 of the accompanying drawings, the pipe support comprises a carrier 1, including side plates 2, a bell-crank lever 3 pivoted by a headed pivot pin 4 between the side plates 2 of the carrier and having front and rear arms 5 and 6 respectively, load attachment means 7 on the front arm 5 whereby a pipe to be supported is connected to the lever 3, twin connecting links 8 connected to the rear arm 6 by adjustable means 9 and to a piston 10 operating in a housing 11 containing a helical compression spring 12 which acts on the connecting links 8 through the piston 10.

In accordance with the pipe support of our co-pending U.S.A. patent application Ser. No. 666,975 locking means 13 is provided between the housing 11 and the piston 10.

The housing 11 is of oblong box form of square vertical section. It comprises square front and rear end plates 14 and 15 respectively and a U-section 16 welded at its ends to the end plates such that it provides a top wall and two side walls of the housing. The bottom of the housing is open except for two side flanges 17 adjoining the side walls which are integral with the U-section 16 and extend for the lengths of the side walls. At least the rear end plate 15 may be formed alternatively as a cap which fits over the end of the U-section 16 and is fixed to the U-section by screws. There is a central vertically-extending slot 18 in the front end plate 14 through which the connecting links 8 pass out of the housing. The spring 12 extends horizontally, centrally, between the front end plate 14 and the piston 10 and is located in position by lugs 19 on the front end plate and piston. Each of those parts of the U-section 16 which form the side walls of the housing has a closed-ended slot 20 in it. The slots 20 of the two side walls are directly opposite one another centrally of the depths of the side walls and are inclined at 45° in the same direction circumferentially of the housing.

The piston 10 is a free moving fit in the housing 11. It has a square crown plate 21 and, welded to the crown plate, two angle-section skirt plates 22 each of which forms one side and part of an adjacent side of the skirt of the piston. Recesses 23 are cut into two diagonally opposite corners of the crown plate 21. Free, guided movement of the piston in the body is ensured by two diagonally opposite pairs of rollers 24 mounted at the opposite corners of the piston containing the recesses 23, the rollers running along the adjacent corners of the housing 11 in the angles respectively between one side wall and the top of the housing and between the opposite side wall and the adjoining side flange 17, FIG. 4. The rollers 24 are rotatably supported in U-section brackets 25 fixed to the skirt plates 22 and in the recess 23 of the crown plate of the piston. Each side wall part of the skirt plate 22 has a closed-ended slot 26 in it. The slots 26 are of the same lengths and widths as the slots 20 in the side walls of the housing and are inclined at 45° but in the opposite direction to the slots 20 circumferentially of the piston. The piston is assembled in the housing with the slots 26 opposite the slots 20 of the housing, the adjacent slots being at right angles to one another, FIG. 1. The piston fits over the rearward portion of the spring, the skirt plates 22 extending around the spring and the lugs 19 at the piston which locate the spring being on the crown plate 21. There is a central hole 21' in the crown plate through which the connecting links 8 pass with clearance.

The skirt plates 22 lie close to the side walls of the housing so that the piston is thereby prevented from tilting in the housing and the spring is maintained in the central position in the housing at all times.

Instead of the rollers 24, the piston and housing may possibly have co-operating surfaces of a low frictional resistance, provided for example by polytetrafluoroethylene, which allow the piston to move freely in the housing.

As best seen in FIGS. 1 and 2, the connecting links 8 are pivoted at their rear ends on a connecting pin 27 which is located across the rear of the crown plate 21 of the piston 10 over the central hole 21' by angle-section retainers 27' fixed on the crown plate. Cotter-pins 27" are applied to the connecting pin 27 to retain the connecting pin to the connecting links and restrain the connecting pin from axial movement relative to the retainers 27'. A spacer tube 28 fitted to the connecting pin 27 between the connecting links 8 maintains them in spaced relationship on the connecting pin. Washers 29 are fitted to the connecting pin outside the connecting links to space them from the adjacent edges of the central hole 21'. The front ends of the connecting links are pivotally connected to the lever 2 in a manner which will be described below. Because of the pivoted connection of the connecting links to the piston 10 angular movement of the links relative to the piston is possible, but the links nevertheless act centrally on the piston through the connecting pin 27.

Instead of the twin connecting links 8 a single central link may connect the piston to the lever. The link may take the form of a rod the rear end of which extends through the central hole in the crown plate, passes through a fulcrum washer, which allows angular movement of the rod relative to the crown plate, and is retained to the crown plate by a retaining nut or nuts.

The side plates 2 of the carrier 1 are vertically arranged and extend parallel to one another from the front end plate 14 of the housing to which they are adjustably secured at opposite sides of, and equally spaced from, the central longitudinal axis of the housing. Each of the side plates 2 is of trapezoidal shape with an oblique front edge sloping rearwardly down to the bottom of the plate and is bent outwardly at the rear to form a vertically extending fixing flange 30. Aligned, vertically extending slots 30', FIG. 5, are formed in the fixing flange 30 which are engaged by fixing bolts 31 screwed into screw-threaded holes in the front end plate 14 of the housing. The slots 30' allow the housing to be adjustably positioned vertically relative to the side flanges before the fixing bolts 31 are tightened to fix the housing to the side plates. This adjustable fixing enables the spring moment on the bell-crank lever 3 to be altered, as will be described below. Along their upper edges the side plates have horizontally projecting flanges 32, FIG. 3, which overlap and are welded together. To the underside of the lowermost of the flanges 32 nuts 34 are welded in register with plain holes 35 in the flanges for bolting the carrier to an overhead support for use of the pipe support. Instead of the nuts 34, suspension lugs may be secured to the uppermost one of the flanges 32, as indicated in alternative arrangements at 36 in FIGS. 1 and 3. It will be appreciated that the overlapping flanges 32 reinforce the carrier at its mounting.

The bell-crank lever 3 is of composite construction. Its front and rear arms 5 and 6 each comprise a pair of elongate channel-section members 5', 6' which extend parallel to one another and are disposed with the open sides of their channel-sections facing. These members 5', 6' are made from standard, pressed channel-section. The channel-section members 5' of the front arm 5 are welded to the respective channel-section members 6' of the rear arm 6 at an intermediate part of the length of the rear arm, and they extend upwardly from the rear arm at a wide acute angle. It will be seen, therefore, that the resultant lever has a generally Y-shape, the rear arm 6 providing the leg of the Y which extends down below the inner end of the front arm 5. For convenience in manufacture and reduction of waste material, the channel-section members 5', 6' may be taken by oblique cuts from the same lengths of the standard channel-section, the oblique cuts enabling inclined inner ends of the front arm channel-section members 5' to be presented to the rear arm channel-section members 6' for them to be fixed at the required acute angle. The complementary inclined ends of the rear arm's channel-section members produced by the oblique cuts are conveniently presented at the upper ends of the rear arm, as can be seen in FIG. 1. There are co-axial holes 37 of complementary diameter to the pivot pin 4 in the webs of the channel-section members 6' of the rear arm through which the pivot pin passes, the holes 37 being centered where the central longitudinal axes of the front and rear arms intersect. A tie 38 connects the channel-section members 6' at the upper end of the rear arm.

Lateral strength of the lever 3 is enhanced by the channel-section of the members 5', 6' of the front and rear arms, thereby increasing the resistance to distortion of the lever under transverse loading which might be exerted by a pipe during use of the pipe support. The length of the front arm 5 may be reduced easily to suit particular load requirements, and, if necessary, extension pieces may readily be fixed to the free ends of the channel-section members 5' of the front arm 5 to extend the effective length of that arm, as indicated at 5" in FIG. 1.

At the junction of the front arm 5 with the rear arm 6 bearing plates 39 of symmetrical trapezoidal shapes are welded to the outsides of the channel-section members 5',6' at the angle between the members. By virtue of their trapezoidal shapes these bearing plates 39 may be cut from plate strip with minimal material wastage. The bearing plates 39 strengthen the joints between the channel-section members 5',6' but also they carry bearings 40 through which the pivot pin 4 passes. The bearing plates are immediately inside the side plates 2 of the carrier 1. Beyond the bearings 40, the pivot pin is located adjacent its ends in complementary diameter holes in the side plates 2. The head 4' of the pivot pin at one end and a cotter pin 41 applied to the other retain the pivot pin to the side plates.

Within the possible range of angular movement of the lever about the pivot pin 4, the front arm 5 of the lever is exposed at least in part below the oblique front edges of the side plates 2 of the carrier 1. The load attachment means 7 on the front arm is therefore exposed for attention, if necessary. The load attachment means comprises a turnbuckle 42 pivotally supported at an upper eye screw 43 on a load pin 44 carried by a pair of square bearing blocks 45 mounted in the channels of the channel-section members 5' of the front arm. The load pin 44 locates in bushes 46 in the bearing blocks 45. Initially the bearing blocks 45 are slidable along the channel-section members 5' to adjust the distance of the load pin 44 from the lever's pivot pin 4, and thereby the length of the load arm of the lever, as required for use. Once the position of the bearing blocks 45 has been set they are fixed to the channel-section members 5' by screws 71, FIG. 2, or they may be fixed by welding. As shown in FIG. 1 with the attachment means at the free end of the front arm the connection of the attachment means to the lever lies close under the overlapping flanges 32 of the side plates 2. It will be appreciated, therefore, that the connection will also be close to the overhead supporting surface of the pipe support when it is in use, thereby enabling the pipe support to be installed in a relatively confined space above a pipe to be supported.

An arcuate scale 47, FIG. 1, conveniently graduated in centimetres, is bolted to one of the side plates 2. The scale is fixed so that it extends alongside the arcuate path which the load pin 44 supporting the turnbuckle 42 follows when the lever pivots. A pointer 48 fixed on the front arm 5 of the lever by one of the screws 71 used to fix the bearing blocks 45 co-operates with the scale 47 to indicate extent of vertical movement of a pipe supported by the lever in use of the pipe support. The scale 47 is secured in position when the pipe support has been set for use so that the pointer 48 is opposite the zero mark on the scale. Before the pipe support is mounted for use the scale may be parked against the side plate of the carrier 1 to which it is bolted to be out of the way and less likely to be damaged. It is swung from the parked position into its position of use when the pipe support is ready for use.

The length of the load arm of the lever is infinitely variable before the bearing blocks 45 are fixed to set the length, from lengths shorter than to lengths longer than the spring arm of the lever.

Adjustable means 9 by which the connecting links 8 are connected to the rear arm 6 of the lever 3, comprises a clevis 49 carrying a connecting pin 50 to which the forward ends of the connecting links are pivoted, and an adjusting screw 51. A spacer tube 52 on the connecting pin 50 keeps the connecting links spaced apart on the connecting pin. The connecting links are disposed in the space between the channel-section members 6' of the rear arm, below the tie 38. The clevis 49 is made up of a pair of side members 53 of metal plate connected by a cross member 54, also of metal plate, to which they are welded. The side members 53 slide along and are guided by the channels of the respective channel-section members 6'. Slots 55 are formed in the side members 53 for the pivot pin 4 of the lever to pass through and allow the clevis to move along the rear arm relative to the pivot pin. The adjusting screw 51 extends rotatably through a central plain hole 56 in a yoke plate 57 fixed across the bottom ends of the channel-section members 6' of the rear arm. A head 58 of the adjusting screw lies against the underside of the yoke plate 57 and a nut 59 welded to the screw above a spring washer 60 bearing on top of the yoke plate restrains the adjusting screw from axial movement relative to the yoke plate. The adjusting screw threadedly engages in a threaded hole 61 in the cross member 54 of the clevis. Rotation of the adjusting screw 51 adjusts the position of the clevis longitudinally along the rear arm 6, thereby to adjust the distance of the connecting pin 50 from the lever's pivot pin 4, and so vary the length of the spring arm of the lever. The spring washer 60 reduces the sound which is apt to occur upon sudden shifting of the clevis on the lever.

Scales 62, FIG. 1, are attached to the cross member 54 of the clevis 49 for movement with the clevis alongside the channel-section members 6' of the rear arm, and pointers 64 marked on the channel-section members indicate on the scales percentages of adjustment of the spring moment on the lever to either side of a mean position set by the clevis.

As stated above, the adjustable fixing of the housing 11 to the side plates 2 of the carrier 1, provided by the slots 30' of the side plate flanges 30 and the fixing bolts 31, enables the spring moment on the lever to be altered. Vertical adjustment of the housing relative to the carrier varies the distance of the central longitudinal axis of the spring from the axis of the pivot pin 4 and similarly alters relative to the axis of the pivot pin the vertical position of the pivotal axis of the connecting links 8 at the connecting pin 27 on the piston 10. The movement of the spring and operation of the piston in the housing is unaffected by the vertical adjustment because of the pivoted connection of the connecting links to the piston. FIG. 5 illustrates the effect of the vertical adjustment. A normal operating position of the connecting pin 27 is indicated at A, being a position the connecting pin would occupy when the housing is set in a vertical position relative to the carrier for the spring moment on the bell-crank lever 3 to counterbalance the mean load specified for the pipe to be supported by the pipe support during use. R indicates the perpendicular distance from the axis of the pivot pin to the central longitudinal axis of each connecting link 8 passing through the axis of the connecting pin 27 at the piston and the connecting pin 50 at the lever. If the housing is adjusted relative to the carrier to raise the connecting pin 27 above the normal position to a higher position B the perpendicular distance R is increased as indicated at R+, thereby increasing the spring moment on the lever. Conversely if the housing is adjusted to drop the connecting pin 27 below the normal position to a lower position C, the perpendicular distance R is reduced as indicated as R— and the spring moment on the lever is accordingly reduced.

It will be appreciated, therefore, that by appropriate adjustment of the vertical position of the housing relative to the carrier when initially setting up the pipe support for use, the spring moment on the lever may be boosted or reduced, if desired, from what would be required to counterbalance the mean operating load moment of the pipe on the lever. During use of the pipe support vertical adjustment of the housing may be made to alter the spring moment to compensate for the effect of pipe ratchet in the supported pipe, or to compensate for deviation of the spring from its initial rating.

Screw adjustment means may be provided which is operatively connected to the carrier and the housing whereby adjustment of the housing relative to the carrier can be effected to alter the spring moment on the lever. A screw mounted on the housing for rotation but restrained from axial movement may, for example, be engaged in a complementally screw-threaded hole in a lug, or a fixed nut, on the carrier to provide the means of adjustment of the housing relative to the carrier.

If adjustment of the position of the connecting pin 50 along the rear arm 6 of the lever should be required, it can be made readily by adjustment of the clevis 49 by the adjusting screw 51. Being at the bottom end of the rear arm of the lever, away from the overhead supporting surface for the pipe support, access can be gained easily to the adjusting screw 51 to make the necessary adjustment.

A limit to upward angular movement of the front arm 5 of the lever 3 is provided by abutment of the tie 38 at the rear arm 6 against the front end plate 14 of the housing 11.

The locking means 13 comprise in association with each adjacent pair of slots 20, 26 of the housing 11 and piston 10 a bolt 72 which extends through the slots and is fitted with a lock washer 73 and a lock nut 74 located respectively outside the housing and inside the piston. On tightening the bolt 72 in the lock nut 74 the lock washer 73 and lock nut clamp the piston to the housing to prevent the spring from moving. The lock washer and lock nut each have a short square spigot portion, FIG. 4, which fits into the respective slot, and is freely slidable in the slot when the bolt is slackened in the lock nut, whilst restraining the lock washer or lock nut, as the case may be, from turning. The piston may be clamped to the housing to restrain the spring from movement at any position within its range of movement in the housing. It can move freely in the housing when the locking means 13 are released.

A modification to the locking means 13 is shown in FIGS. 6 and 7 of the accompanying drawings. Here each of the slots 20 of the housing 11 has teeth 75 along its longitudinal edges, and the spigot portion 76 of the adjacent lock washer 73 is rectangular, its longer sides 77 being plain and its shorter sides being formed with teeth 78 complementary to the teeth 75 of the slot. The toothed shorter sides of the spigot portion are shorter than the width of the slot between the teeth 75 and the plain longer sides are of such a length that the teeth 78 of the shorter sides can be engaged with the teeth 75 of the slot. When the locking means is applied the teeth 78 of the spigot portions 76 of the lock washers 73 are engaged with adjacent teeth 75 of the slots 20, as shown in FIG. 6. Thus, in addition to the clamping action between the piston and housing when the bolts 72 are tightened to prevent the spring from moving there is the positive interaction between the teeth 75, 78 which resists movement of the piston in the housing. When the locking means is released the lock washers may be turned on the slackened bolts 20, as shown in FIG. 7, to bring the plain longer sides 77 of the spigot portions 76 opposite the teeth 75 of the slots and allow free relative movement between the lock washers and the slots 20 longitudinally of the slots.

The teeth of the slots 20 could be along just one of the longitudinal edges of the slots. A further alternative would be to have teeth or analogous formations on the outer surface of the housing adjacent the slots, and to provide the lock washers 73 with mating formations on their facing surfaces.

It will be realized that the pipe support described and illustrated is of compact construction suitable for use in confined spaces between supporting surfaces for the pipe support and the pipe it is to support, that the spring moment on the lever may be adjusted whilst the pipe support is in use, and that the piston may be readily locked against movement on the spring at any position of the spring within its range of movement. Furthermore the generally closed form of the housing 11 keeps debris, dust and such undesirable matter from collecting in the housing and fouling the piston and spring.

If required the side plates of the carrier, the housing, piston and lever may be galvanized or otherwise protectively coated, the manner of applying the pivot pin to the side plates of the carrier and the lever, the connecting pin 27 to the piston and the bearing blocks 45 to the lever enabling those elements to be fitted readily after the coating process.

Instead of being suspended for use, the pipe support may be inverted for base mounting. For that arrangement the side plates 2 of the carrier 1 conveniently have their horizontally projecting flanges 32 projecting outwards, rather than inwards and overlapping, for mounting the carrier on the base support. The turnbuckle 42 extends down between the side plates to support the pipe.

A shock absorber may be fitted to the pipe support for the purposes of damping out sudden movement in a supported pipe. For example a standard, flange-mounted, lateral type hydraulic shock absorber may be mounted on the rear end plate 15 of the housing 11, its piston extending centrally through the end plate into the housing and being connected centrally to the crown plate 21 of the piston 10 to be responsive to movement of the spring 12. The effective use of the shock absorber is made possible because of the pure linear movement of the spring and piston 10 in the housing.

In a modification for supporting a pipe from below, the pipe support is arranged to be base mounted as described above, and the front arm 5 of the lever 3 forms part of a parallel motion linkage which supports the attachment means. In addition to the front arm, the parallel motion linkage includes a link pivoted between the side plates of the carrier parallel to and directly below the front arm and a link extending vertically between and pivoted to the free end of the front arm and the adjacent end of the parallel link. A load plate, which constitutes the attachment means in this modified form of the pipe support, is mounted for height adjustment on the vertical link by a central screw engaged with a nut fixed on the upper end of the link. Vertical movement of a pipe supported on the load plate may be indicated by means of an arcuate scale which may cooperate with a pointer on the front arm, as previously described, or with a pointer on the vertical link.

Reference will now be had to FIGS. 8, 9 and 10 of the accompanying drawings which illustrate a modified version of the pipe support described in which the spring force on the lever is applied in a direction opposite to that in which the load of a pipe attached to the lever in use of the pipe support is exerted on the lever. The pipe support is suspended for use so that the spring force is exerted vertically. This modified version is even more compact than the pipe support as described above and can be installed in confined spaces where there is limited accessibility and where the pipe support as described above may not have sufficient space to operate.

Parts of the pipe support corresponding to those of the embodiment described above are identified by corresponding reference numerals.

The pipe support comprises a carrier 1 having a pair of parallel side plates 2, a lever 3 pivoted by a headed pivot pin 4 between the side plates of the carrier, load attachment means 7 whereby a pipe to be supported is connected to the lever, twice connecting links 8 connected to the lever and to a piston 10 supported on a helical compression spring 12 in a housing 11 for vertical movement relative to the housing. The piston and housing are similar to and are constructed in essentially similar manner to their counterparts in the foregoing embodiment. Similar locking means 13 is provided between the housing 11 and piston to lock the spring, and the carrier 1 is adjustably connected by bolts 31, as before, at flanges 30 to a bottom end plate 14 of the housing for the purpose of enabling the spring moment on the lever to be adjusted. A suspension plate 79 is secured centrally across a top end plate 15 of the housing and has horizontally spaced holes 80 in it whereby the pipe support is suspended in use. Spaced angle-section, as indicated at 81 by broken lines in FIG. 9, may alternatively be secured across the top end plate 15 for suspension of the pipe support. Other suitable means for suspension of the pipe support may be provided, if desired, including means for a single-point suspension.

It will be seen that the twin connecting links 8, which are pivotally connected centrally by a connecting pin 27 to a crown plate 21 of the piston 10 in the manner previously described, depend vertically, or substantially vertically, from the piston and through the bottom end plate 14 of the housing by way of a central opening 18. The pivoted connection of the connecting links to the crown plate 21 allows some angular movement of the links relative to the piston, but the links nevertheless act centrally on the piston through the connecting pin so that the piston is not urged to tilt under angular movement of the links. Rollers 24 of the piston running in opposite corners of the housing maintain the piston in the true, free running position in the housing at all times during use.

The carrier 1 lies within, or substantially within, the plan area of the housing 11, even when the carrier is adjusted relative to the housing to adjust the spring moment on the lever. The side plates 2 of the carrier are of inverted right-angled triangular shape, the flanges 30 by which they are connected to the housing being at the base sides of the triangular shapes and being disposed adjacent and parallel to the two sides of the housing 11 which do not contain the slots 20 of the locking means 13. A tie plate 82, FIGS. 8 and 9, extends between and is fixed to the side plates adjacent to the perpendicular sides of the side plates, at intermediate parts of their lengths.

The lever 3 is pivoted between the side plates 2 at their lower parts by the pivot pin 4 retained to the side plates by a cotter pin 41 in the angles between the perpendicular sides and hypotenuses of their triangular shapes. The pivot pin 4 is spaced below the tie plate 82. As will be best seen in FIGS. 9 and 10 of the drawings, the lever 3 is of composite construction. It comprises a pair of elongate outer channel-section members 83 and a pair of elongate inner channel-section members 84, the members of each pair extending parallel to one another and being disposed with the open sides of their channel-sections facing. The outer members 83 are fixed in partially overlapping relationships to, and at a wide obtuse angle to, the inner members 84 with the aid of fillets 85 secured between the outer members at one of the ends thereof and intermediate parts of the inner members. At their opposite ends from the fillets 85 the outer members 83 are connected by a yoke 86. A tie plate 84' connects the inner members 84 at their ends remote from the pivot pin. The pivot pin extends freely through apertures 87 in the outer members 83 near to the mid-points of the lengths of those members, and through apertures 88 in the inner members 84 near to one of the ends thereof contained by the outer members. Gudgeon pieces 89 fixed on the outsides of the outer members 83 co-axially with the apertures 87 in those members are fitted with bushes 90 for the pivot pin. The pivot pin is engaged with the side plates 2 immediately beyond the gudgeon pieces 89.

Slidably located by the outer members 83 of the lever is a clevis 91, FIG. 10, which carries co-axial connecting pins 92 to which the lower ends of the connecting links 8 are pivoted. The clevis 91 comprises two pairs of side members 93 of metal plate connected by a cross member 94, also of metal plate, to which the side members 93 are welded. Each pair of side members 93 has one of the connecting pins 92 secured between the members, and the connecting link 8 associated with the connecting pin disposed between the pair of side members. The pairs of side members 93 slide along and are guided by the channels of the outer members 83. There are slots, not shown, in the upper flanges of the channel sections of the outer members through which the connecting links extend and which allow for relative angular movement between the connecting links and the lever about the axis of the connecting pins 92. Slots 95 are provided in the side members 93 for the pivot pin 4 of the lever to pass through and allow the clevis to move along the outer members 93 relative to that pivot pin. An adjusting screw 96 extending rotatably through a central hole 97 in the yoke 86 and retained against axial movement relative to the yoke by a nut 98, which is welded to the screw, threadedly engages in a threaded hole 99 in the cross member 94 of the clevis. Rotation of the adjusting screw 96 adjusts the position of the clevis longitudinally along the lever, thereby to adjust the distance of the connecting pins 92 from the lever pivot pin 4 and vary the length of the spring arm of the lever.

A scale 100, FIG. 8, is fixed to each of the outer members 83 of the lever alongside a window 101 in the member and a pointer 102, conveniently provided by a square-headed screw on an adjacent end of the cross member 94 of the clevis, visible through the window 101, indicates on the scale percentages of adjustment of the spring moment on the lever to either side of a mean position set by means of the clevis. The scale 100 is fixed to the outer member after the clevis has been initially set for use so that the mean position is indicated opposite the pointer 102.

The load attachment means 7 is attached to the inner channel-section members 84 of the lever. The attachment means 7 comprises, as before, a turnbuckle 42 pivotally supported at an upper eye screw 43 on a load pin 44 located in bushes 46 in a pair of square bearing blocks 45 which are mounted in the channels of the inner members and which initially are slidable along the inner members to set the distance of the load pin 44 from the pivot pin 4, as required, before they are fixed in position by screws 71, FIG. 10, or alternatively by welding. Thus again, within the lengths of the inner members of the lever from the pivot pin 4 to the outer ends of the inner members the length of the load arm of the lever is infinitely variable from lengths shorter than to lengths longer than the spring arm, as indicated in FIG. 10. If longer load arms are required extensions may be fixed to the inner members to receive the bearing blocks 45.

An arcuate scale 47, FIG. 8, is bolted to one side plate 2 of the carrier at the corner of the side plate between the base and hypotenuse sides of the triangular shape of the plate. In use the scale 47 extends alongside the arcuate path of movement of the load pin 44 when the lever pivots, and a pointer 48, fixed on one of the inner members 84 of the lever by the respective one of the screws 71 used to fix the bearing blocks 45, co-operates with the scale to indicate extent of vertical movement of a pipe supported by the lever in use of the pipe support. The scale may be swung about the screw 71 to a parked position in which it lies alongside the side plate and is out of the way.

If during use adjustment of the spring arm of the lever should be required, the clevis 91 can be adjusted by means of the adjusting screw 96, which is readily accessible from the end of the lever at the side of the pivot pin 4 remote from the supported pipe, where it is clear of the pipe and also of the carrier 1 and housing 11, as will be appreciated from FIG. 8.

A limit to downward pivoting movement of the lever under the action of the supported pipe is provided by the tie plate 82 between the side plates 2 against which the outer members 83 of the lever are able to abut to stop the movement. A limit to upward turning movement of the lever is provided by abutment of the inner members 84 of the lever against the bottom end plate 14 of the housing 11 at the side edge of the bottom end plate remote from the tie plate 82.

When the locking means is not in use the bolts 72, lock washers 73 and lock nuts 74 may possibly be removed altogether from engagement with the slots 20, 26 and stored, as indicated in FIG. 8, on the tie plate 82, clear of the lever, until required for use, the tie plate being formed with holes to receive the bolts 72 for that purpose.

I claim:

1. A pipe support of the constant tension kind which comprises a carrier, a pivot on said carrier and a lever which is pivotally mounted on said carrier by said pivot, load attachment means on said lever adapted to connect a pipe to be supported to said lever at a position thereon spaced from said pivot, a connecting link connected to said lever, spring means which acts on said lever through said connecting link such that a spring force is exerted on said lever which produces a moment about said pivot, said spring means being slidably connected to said carrier for adjusting the position of said spring means relative to said carrier such as to alter the moment of spring force about said pivot by varying the perpendicular distance from the pivotal axis of said lever to a central longitudinal axis of said connecting link, and screw retention means adjustably connecting said spring means to said carrier and acting between said spring means and said carrier to secure said spring means and said carrier against relative sliding movement in any adjusted position of said spring means.

2. A pipe support according to claim 1 wherein said carrier has slots extending in the direction of relative sliding movement required between said carrier and said spring means for altering the moment of the spring force about said pivot, and said screw retention means comprises male screw-threaded members which pass through said slots, are engaged with complementally screw-threaded holes associated with said spring means and when tightened bear on said carrier adjacent to said slots thereby to secure said spring means and carrier against the relative sliding movement, said slots and male screw-threaded members permitting the relative sliding movement when said male screw-threaded members are loosened, and said slots defining limits of available adjustment for altering the moment of the spring force.

3. A pipe support according to claim 1 wherein said spring means comprises a spring element contained in a housing and acting between a part of said housing and a piston operating in said housing connected to said connecting link, which is thereby acted upon by said spring element through said piston, and said housing is slidably connected to said carrier by said screw retention means such that the position of said housing, and hence of said spring element, relative to said carrier is adjustable for altering the moment of the spring force about said pivot.

4. A pipe support according to claim 3 wherein said piston has a skirt which extends closely alongside walls of said housing thereby to restrain said piston from tilting in said housing, said spring element is a helically coiled compression spring, and said skirt of said piston extends co-axially about one end of said spring.

5. A pipe support according to claim 3 wherein said piston has a crown part having an opening through which said connecting link extends with clearance, a pin is retained to said crown part across said opening at a side of said crown part remote from said lever, and said connecting link is pivotally connected to said crown part by said pin.

6. A pipe support according to claim 3 wherein said piston carries rollers which engage with said housing and guide said piston freely in its movement relative to said housing.

7. A pipe support according to claim 3 wherein said piston and said housing have adjacent parts in which are slots which are inclined with respect to one another and portions of which are in register throughout the range of operative movement of said piston relative to said housing, and said piston and housing are connected by clamping means including a male screw-threaded member which extends through said registering portions of said slots and which when tightened causes said piston to be locked to said housing by said clamping means.

8. A pipe support according to claim 7 wherein there are toothed formations along a longitudinal side of one of said slots, and said clamping means includes an element with which said male screw-threaded member is engaged and which has toothed formations which are complementary to and co-operate with said toothed formations along said slot when said male screw-threaded member is tightened to provide a mechanical interconnection between said element and said slot.

9. A pipe support according to claim 3 wherein said carrier comprises opposed side plates between which said lever is disposed on said pivot which is retained to and extends between said side plates, and said housing is slidably connected to said side plates.

10. A pipe support according to claim 9 wherein each said side plate has a lateral flange projecting away from the opposite one of said side plates, and said housing is slidably connected to said flanges.

11. A pipe support according to claim 9 wherein said housing has an end wall on which said spring element acts and which has an opening through which said connecting link extends between said lever and said piston, and said housing is slidably connected at said end wall to said side plates of said carrier.

12. A pipe support according to claim 1 wherein screw adjustment means is operatively connected to said carrier and said spring means whereby sliding movement of said spring means relative to said carrier is effected to alter the moment of the spring force about said pivot.

13. A pipe support according to claim 1 wherein said spring means comprises a housing having opposed first and second walls, a piston operating in said housing between said first and second walls, a helical compression spring element contained in said housing between and acting on said second wall and said piston, said second wall having an opening through which extends said connecting link which is pivotally connected to said piston, said spring element thereby acting on said connecting link through said piston, and said housing is slidably connected at said second wall to said carrier by said screw retention means such that the position of said housing, and hence of said spring element, relative to said carrier is adjustable for altering the moment of the spring force about said pivot.

14. A pipe support according to claim 13 wherein said connecting link and said attachment means are connected to said lever at the same side of said pivot such that the spring force exerted on said lever through said connecting link is applied in a direction substantially opposite to that in which the load of a pipe attached to said lever by said attachment means is exerted on said lever when the pipe support is in use, means is provided on said lever to which said connecting link is connected and which is positionally adjustable along said lever, adjustment means is operatively connected to said lever and said positionally adjustable means and is operable from the opposite side of said pivot from said connecting link and said attachment means to cause said positionally adjustable means to be moved along said lever to vary the distance from said pivot to said connecting link, support means is provided on said first wall of said housing by which the pipe support is supported for use, and said support means, said spring element and said attachment means are all substantially in alignment.

15. A pipe support according to claim 14 wherein said lever is substantially straight.

* * * * *